Feb. 16, 1960

D. R. JOHNSTON 2,925,412

MANUFACTURE OF ORGANIC SUBSTANCES OF
VERY HIGH MOLECULAR WEIGHT

Filed March 18, 1954

D. R. JOHNSTON
INVENTOR

ATTORNEYS

2,925,412

MANUFACTURE OF ORGANIC SUBSTANCES OF VERY HIGH MOLECULAR WEIGHT

David Robert Johnston, Spondon, near Derby, England, assignor to British Celanese Limited, a corporation of Great Britain Application March 18, 1954, Serial No. 417,170

Claims priority, application Great Britain March 24, 1953

9 Claims. (Cl. 260—230)

This invention relates to the manufacture of organic substances of very high molecular weight, especially cellulose esters of organic acids such as cellulose acetate, and in particular to their precipitation from solution.

In nearly all the processes used for making cellulose esters of organic acids, the cellulose ester is obtained in solution. Usually the solvent is a lower aliphatic acid, especially acetic acid, which may contain a proportion of water, but it may for example be methylene chloride or ethylene chloride. The cellulose ester is precipitated from the solution by means of a suitable non-solvent; thus it may be precipitated from solution in acetic acid by means of water or an aqueous acetic acid of concentration below about 40%.

The conditions under which the cellulose ester is precipitated are important, for on them depends the form of precipitate obtained. It is for most purposes very desirable to avoid the formation of a horny hard precipitate, since in this form cellulose esters are difficult or virtually impossibly to wash properly, and even after prolonged washing may contain an unacceptably high proportion of acid and other impurities. On the other hand, cellulose esters precipitated in the form of a fibrous flake are easy to wash, and this is a form to be aimed at.

The present invention provides a simple method of precipitating from their solutions cellulose acetate and other cellulose esters of organic acids, by means of which the precipitate can be obtained in an easily washed fibrous form. The new method can also be used for precipitating other organic substances of very high molecular weight.

According to the invention, organic substances of very high molecular weight, especially cellulose esters of organic acids, are precipitated from their solutions by rapidly and intimately mixing unsupported streams of the solution and of a liquid non-solvent for the organic substance which is miscible with the solvent in which the organic substance is dissolved. Such liquid non-solvents will hereafter be referred to as precipitants, in accordance with conventional usage. While this intimate mixing may be achieved simply by collision, especially substantially head-on collision, between the streams, the preferred method is to cause an unsupported stream or streams of the solution and an unsupported stream or streams of the precipitant to impinge simultaneously on the same area or on immediately adjacent areas of a solid surface, hereinafter referred to as the "impact surface." In this preferred method the unsupported streams of the solution and the precipitant may with advantage be substantially parallel and in contact with each other, the stream or streams of the solution being preferably surrounded by the stream or streams of the precipitant.

While the unsupported streams of solution and precipitant may remain quite distinct until they reach the impact surface, a certain amount of mixing may take place in advance of the impact surface. When the streams are substantially parallel and in contact with each other, a degree of mixing will as a rule take place without the use of any special means to promote it, especially when, as is preferred, a stream of solution travels more slowly than a surrounding stream or streams of precipitant. The degree to which such mixing takes place may however be increased by means adapted to promote turbulent flow in one or more of the streams or by causing the streams to converge slightly.

It is not necessary that all the precipitant employed should be in the form of an unsupported stream as described above, and it may be found advantageous to cause additional quantities of the same or another precipitant to flow across the impact surface. Even when such additional precipitant is used it is preferable that the amount of precipitant in the unsupported stream or streams should be at least sufficient to effect the precipitation of substantially the whole of the organic compound of high molecular weight, the additional precipitant serving primarily to aid in sweeping the precipitate rapidly from the impact surface.

For the sake of brevity, the invention will be further described with particular reference to the precipitation of cellulose acetate from its solutions, especially from solutions such as are obtained in the manufacture of the cellulose acetate.

The cellulose acetate solution may be extruded either at room temperature or at a higher temperature which may be below or above the boiling point of the solvent. For example, solutions of cellulose acetate in acetic acid which have been ripened at an elevated temperature, e.g. a temperature between 50° and 80° C., may often conveniently be extruded at about the ripening temperature. The precipitant may be at about the same temperature as the cellulose acetate solution, or it may be at a higher or lower temperature. The solution or the precipitant or both may be heated to a temperature such that part or all of the solvent is vapourised during the operation, particularly when a low boiling solvent such as methylene chloride is used.

The form of the precipitate may be varied to some extent by varying the temperature of the solution; thus if a precipitate is required which, while retaining the fibrous flake form characteristic of the invention, has at the same time a high bulk density, the solution should be at a fairly low temperature, e.g. between about 20° and 40° or 50° C. when precipitating cellulose acetate from solution in acetic acid by means of water or an aqueous acetic acid; conversely if a precipitate of low bulk density is required, the solution should be at a higher temperature, e.g. between about 60° and 80° C. or even higher.

It is of course necessary to ensure that the viscosity of the cellulose acetate solution at the temperature at which it is extruded is such that it is capable of being formed into a fairly rapidly flowing stream without using an undesirably high pressure, and if in any instance the viscosity is too high for this, the solution may be thinned with further quantities of solvent for the cellulose acetate.

The invention includes not only the new precipitation method, but also devices for carrying it out comprising a nozzle for forming a stream or streams of the solution and a stream or streams of liquid precipitant, and a solid impact surface positioned so that the said streams impinge thereon, the nozzle and impact surface being so arranged that the streams of solution and precipitant impinge on the same or on immediately adjacent areas of the impact surface. Preferably the streams are caused to impinge on part of the interior surface of a precipitating vessel from which the resulting slurry of precipitate in the mixture of solvent and precipitant can be run off, and into which, if desired, further precipitant can be introduced as already described to reduce the consistency of the slurry.

In one form of device which has been found to give very good results, the cellulose acetate or other solution and the precipitant are continuously extruded at a fairly high rate of flow through a multiple nozzle comprising a central orifice, preferably an annulus, surrounded by two or more annular orifices which are preferably concentric with the central orifice, alternate orifices serving to form streams of solution and precipitant respectively. Advantageously there may be used a triple nozzle comprising a central orifice, preferably an annulus, surrounded by two annular orifices concentric with it, the precipitant being extruded through the innermost (i.e. the central) and the outermost orifices, and the cellulose acetate solution through the middle orifice. By this means there is obtained a stream of annular cross-section of the cellulose acetate solution, which is bounded on both sides by a stream of precipitant. Other arrangements can however be used. For example a nozzle having only a central circular or annular orifice and an outer annular orifice may be used, the cellulose acetate solution then being extruded preferably through the central orifice, and the precipitant through the surrounding annular orifice. Again, the solution and the precipitant may be extruded through adjacent parallel slots; if the nozzle contains three such slots, the solution may be extruded through the medial slot and the precipitant through the two lateral slots. Adjacent orifices of other shapes, e.g. circular orifices, can be used, though in general with less advantage. For the purpose of the present specification all such extrusion devices are included within the term "nozzles."

Whatever form of nozzle is used, the lips of the orifices may be so formed as to promote a smooth flow of the several streams with little or no intermixing before they reach the impact surface, or they may be shaped so as to cause the streams to converge slightly or to create a substantial degree of turbulence in one or more of the streams, and so to promote a substantial degree of mixing before the streams reach the impact surface. The impact surface may be normal to or inclined with respect to the direction in which the streams are moving, and may be flat or curved.

The precipitation may be carried out for example in a horizontal or inclined tubular vessel at or near one end of which the nozzle is situated, and at or near the other end of which there is provided a run-off for the slurry of liquid and solid materials resulting from the operation. If the vessel is inclined, the nozzle is preferably at or near its higher end, and the run-off at its lower end. The nozzle preferably opens into or extends through the top of the vessel, so that the streams of solution and precipitant impinge vertically on the bottom; the precipitate so formed is then carried as a slurry in the mixed liquids to the run-off at the other end of the vessel. The vessel may, if desired, contain an inlet for additional precipitant, preferably positioned so that liquid which enters the vessel through it flows across the area of the impact surface on which the unsupported streams of solution and precipitant impinge. If in any particular case it is desired to work under conditions such that part or all of the solvent is vaporised, the vessel may be provided with a separate outlet through which the solvent vapour can be withdrawn.

The precipitating vessel may discharge into a collecting vessel in which the precipitate is separated from the liquid, e.g. by decantation, or it may discharge onto a device, such for example as a shaking screen, by means of which the precipitate may be separated from the liquid continuously. After being separated from the liquid the precipitate can be washed and if desired given further treatment; for instance a cellulose ester may be given a stabilisation treatment.

Apparatus in accordance with the invention is illustrated in the accompanying drawing, in which.

Figure 1:
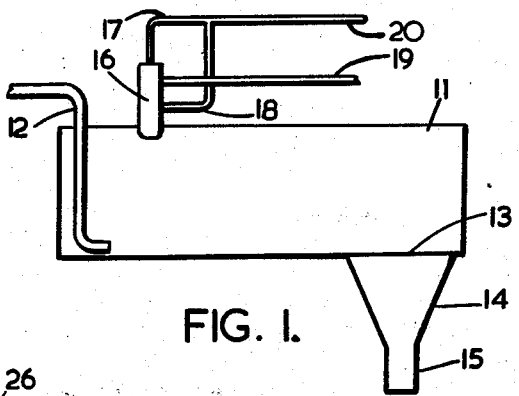
Figure 1 is a sectional elevation of a precipitating device as a whole.
Figure 2:
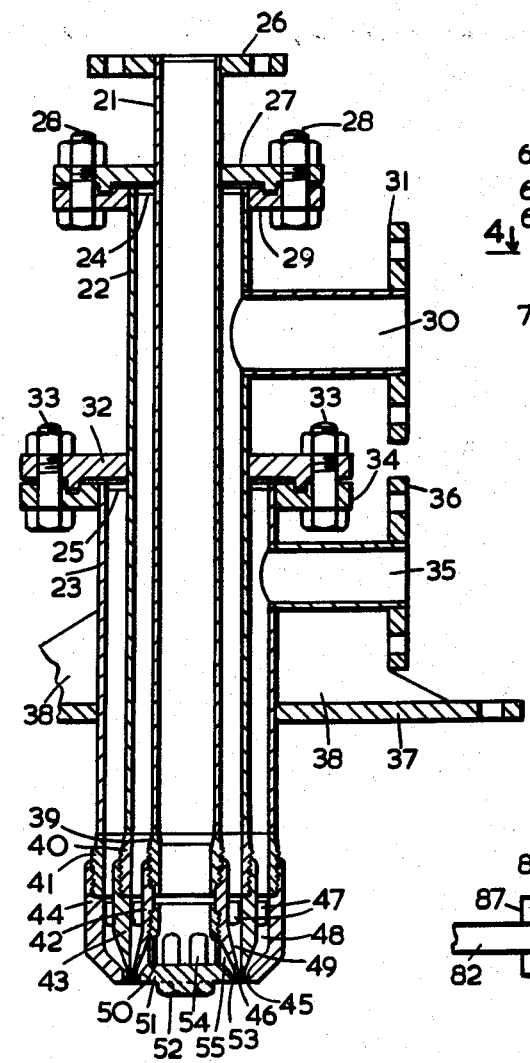
Figure 2 is a sectional elevation, on a larger scale and in greater detail, of the nozzle shown in Figure 1.

Referring to the drawing, the device shown in Figures 1 and 2 comprises a horizontal cylindrical precipitating vessel 11, provided at one end with an inlet pipe 12 for liquid and at the other end with a discharge opening 13 leading via a converging section 14 and a discharge pipe 15 to a separating vessel or a shaking screen (not shown). A nozzle 16 leads into the top of the vessel 11 near to the liquid inlet pipe 12 but a little further from the end of the vessel, and is provided with feed pipes 17 and 18 for precipitant and a feed pipe 19 for the solution to be precipitated. The feed pipes 17 and 18 are themselves fed from a common feed line 20.

The nozzle 16, as shown in greater detail in Figure 2, comprises three co-axial tubes 21, 22 and 23, the innermost tube 21 being the longest and the outermost tube 23 the shortest. An annular end-piece 24, fitting closely round the innermost tube 21, closes one end of the middle tube 22, and a similar end-piece 25, fitting closely round the middle tube 22, closes the corresponding end of the outermost tube 23. The corresponding end of the innermost tube 21 carries a flange 26 by means of which the nozzle is attached to the precipitant feed pipe 17.

The tube 21 is provided with a fixed collar 27, secured by bolts 28 to a flange 29 on the end of the middle tube 22, the collar 27 being just clear of the end piece 24. An inlet pipe 30 enters the tube 22 near its closed end, and carries a flange 31 whereby it is attached to the solution feed pipe 19.

The tube 22 is provided with a fixed collar 32, secured by bolts 33 to a flange 34 on the end of the tube 23, the collar 32 being just clear of the end piece 25. An inlet pipe 35 enters the tube 23 near its closed end, and carries a flange 36 whereby it is attached to the precipitant feed pipe 18. The tube 23 is attached to the wall 37 of the vessel 11 by fins 38, one of which is also attached to the inlet pipe 35.

At their output ends the tubes 21, 22 and 23 are welded to externally threaded connecting sections 39, 40 and 41 respectively, onto which are screwed internally threaded annular members 42, 43 and 44 respectively, so shaped as to form a narrow annular orifice 45 bounded by the lips of the outermost member 44 and the middle member 43, and another narrow annular orifice 46, bounded by the lips of the middle member 43 and the innermost member 42. Fins 47 are provided in the channels 48, 49 leading to these orifices.

An externally threaded tubular member 50 is screwed into the innermost annular member 42 and in effect forms a short extension of the innermost tube 21. At its end the tubular member 50 carries a circular disc 51 having a hexagon boss 52, the diameter of the disc 51 being slightly less than the internal diameter of the innermost annular member 42 at its lip, so that it forms therewith a third and innermost annular orifice 53. Ports 54 adjacent to the disc 51 lead from the interior of the tubular member 50 to the annular channel 55 between the forward ends of the tubular member 50 and the innermost annular member 42.

In operation, a cellulose acetate solution to be precipitated in pumped through the feed pipe 19 and inlet 30 into the space between the innermost tube 21 and the middle tube 22, and flows along this space to the channel 49 and thence to the middle annular orifice 46. At the same time, precipitant is pumped through the line 20 and then through the feed pipe 17, the innermost tube 21, the tubular member 50, the ports 54, and the channel 55 to the innermost orifice 53, and also through the feed pipe 18, the inlet 35, the space between the outermost tube 23 and the middle tube 22, and the channel 48 to the outermost orifice 45. Preferably the streams of precipitant leave the orifices 45 and 53 at a linear speed higher than that at which the solution leaves the orifice 46, though this is not essential. The streams of precipitant and solution impinge on the bottom of the vessel 11, where they meet a stream of further precipitant which has entered the vessel 11 through the liquid inlet pipe 12. On hitting the bottom of the vessel the unsupported streams of solution and precipitant are thoroughly and rapidly mixed, precipitating the cellulose acetate in an easily washed fibrous form, and the slurry of precipitate so produced, diluted with the further precipitant from the inlet pipe 12, flows along the vessel 11 to the discharge opening 13, whence it passes to a settling vessel or a shaking screen.

Figure 3:
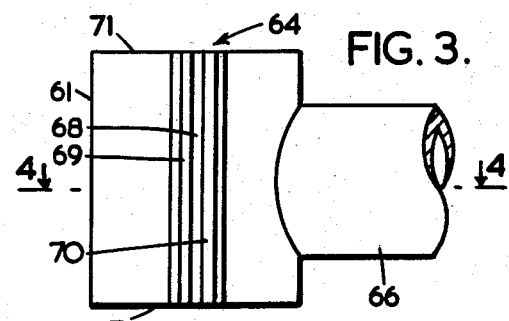
Figure 3 is a plan view of another form of nozzle.
Figure 4:
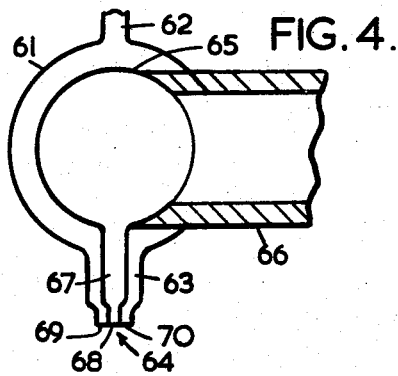
Figure 4 is a sectional view taken on the line 4—4 in Figure 3.

Another type of nozzle, that may be employed in place of that illustrated in Figure 2, is shown diagrammatically in Figures 3 and 4. In this nozzle the orifices have the form of narrow parallel slots. The nozzle comprises an outer cylindrical member 61 provided with a liquid inlet 62 and, opposite to it, a fairly wide passageway 63 of rectangular cross-section extending along the whole length of the member 61 and terminating in a somewhat narrower opening 64. Inside the cylindrical member 61 is a co-axial second cylindrical member 65 of smaller diameter, fed by a pipe 66 passing through the outer member 61. The cylindrical member 65 opens into a passageway 67 of rectangular cross-section extending along the whole length of the member 65 and situated symmetrically within the passageway 63; the passageway 67 narrows to a slot-like orifice 68, the lips of which form with the lips of the opening 64 two further slot-like orifices 69 and 70 symmetrically situated on either side of the orifice 68. The cylindrical members 61 and 65 are closed by common end walls 71.

In working with the nozzle shown in Figures 3 and 4 a cellulose acetate solution to be precipitated is pumped through the feed pipe 66 to the inner cylindrical member 65 and thence through the middle orifice 68, and precipitant is pumped through the inlet 62 to the space between the cylindrical members 61 and 65 and thence through the orifices 69 and 70 on either side of the orifice 68.

Figure 5:
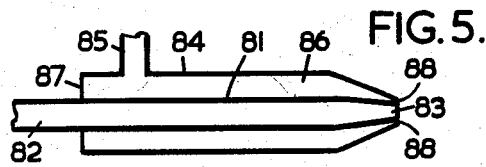
Figure 5 is a sectional elevation of a third form of nozzle.

A third form of nozzle is illustrated in Figure 5, and comprises a cylindrical tubular member 81 having at one end an inlet 82 for liquid, and tapering at the other end to a circular orifice 83. The tubular member 81 is surrounded by a second and co-axial tubular member 84 provided with a liquid inlet 85 and forming with the tubular member 81 an annular passageway 86. This annular passageway is closed at the end nearer the inlet 82 by means of an end wall 87 fitting closely round the tubular member 81, and at the other end it tapers to form an annular orifice 88 concentric with the circular orifice 83.

In working with the nozzle shown in Figure 5 it is preferable pump the cellulose acetate solution through the inner tubular member 81 and the circular orifice 83, and the precipitant through the annular passageway 86 and the anular orifice 88, but these positions may be reversed.

The invention is further illustrated by the following example, in which the device shown in Figures 1 and 2 of the drawing is employed; the "parts" given are by weight.

*Example*

A solution of an acetone-soluble cellulose acetate in about 3 times its weight of a 75% aqueous acetic acid at 65°–70° C. was obtained by pretreating cellulose with acetic acid, acetylating the pretreated cellulose using methylene chloride as the solvent and sulphuric acid as catalyst, ripening the cellulose acetate after adding water, acetic acid and further sulphuric acid, distilling off the methylene chloride, and neutralising the sulphuric acid with an aqueous solution of sodium acetate. This solution, still at a temperature of 65°–70° C., was forced downwardly through the middle annular orifice 46 of the nozzle shown in Figure 2, while aqueous acetic acid of concentration between 7.4 and 14% and at a temperature of 70° C. was forced through the inner annular orifice 53 and the outer annular orifice 45. Simultaneously further aqueous acetic acid of about the same concentration and at about the same temperautre was fed into the vessel 11 through the inlet 12. The streams of cellulose acetate solution and aqueous acetic acid extruded from the nozzle impinged on the bottom of the vessel and were rapidly and thoroughly intermixed, precipitating the cellulose acetate. The precipitate was swept out of the vessel through the discharge opening 13 and pipe 15 with the acid liquid, from which it was then separated. It had the form of a very fibrous flake of low bulk density, and was readily washed substantially free from acid.

While the invention has been described with particular reference to the production of cellulose acetate and its precipitation from solution, it is of value also in the production and precipitation of other organic substances of very high molecular weight, especially cellulose esters such as cellulose propionate, butyrate, acetate propionate, acetate butyrate, and acetate stearate, and cellulose ethers, for example water-soluble methyl cellulose and water-soluble and organic solvent-soluble ethyl celluloses. Examples of other compounds of very high molecular weight in the production of which the process of the invention may be used are polyvinyl compounds such as polyvinyl chloride, polyvinyl alcohol, and polyvinyl acetate, and copolymers derived from two or more vinyl or vinylidene compounds, e.g. copolymers of vinylidene chloride and acrylonitrile. Such compounds may be precipitated either from true solutions or from latices, which for the purposes of this specification are included within the term "solutions."

Having described my invention what I desire to secure by Letters Patent is:

1. Process for the precipitation of a cellulose ester of at least one lower fatty acid having 2–4 carbon atoms in the molecule from solution in a solvent which is a liquid at ordinary temperatures, which comprises causing an unsupported stream of the solution, and at least one unsupported stream of a precipitant flowing parallel to and in contact with the stream of solution in such a way that the stream of solution is substantially completely surrounded by precipitant, to impinge on a solid impact surface, whereby the said streams of solution and precipitant are rapidly and intimately mixed.

2. Process according to claim 1, wherein a stream of precipitant flows across the impact surface.

3. Process for the precipitation of cellulose acetate from solution in acetic acid by means of a precipitant selected from the group which consists of water and aqueous acetic acid of concentration below 40%, which comprises causing an unsupported stream of the solution and at least one unsupported stream of the precipitant, flowing parallel to and in contact with the stream of solution in such a way that the stream of solution is substantially completely surrounded by precipitant, to impinge on a solid impact surface, whereby the said streams of solution and precipitant are rapidly and intimately mixed.

4. Process according to claim 3, wherein a stream of the precipitant flows across the impact surface.

5. Process according to claim 3, wherein the solution travels at a lower linear speed than the precipitant.

6. Process according to claim 3, wherein an annular stream of solution flows between an inner stream and an annular outer stream of the precipitant.

7. Process according to claim 3, wherein a flat stream of the solution flows between two flat streams of the precipitant.

8. Process according to claim 5, wherein an annular stream of solution flows between an inner stream and an annular outer stream of the precipitant.

9. Process according to claim 5, wherein a flat stream of the solution flows between two flat streams of the precipitant.

References Cited in the file of this patent

UNITED STATES PATENTS

| | | |
|---|---|---|
| 1,859,992 | Seil | May 24, 1932 |
| 1,948,625 | Mason | Feb. 27, 1934 |
| 1,949,213 | Mason | Feb. 27, 1934 |
| 2,072,375 | McCallum | Mar. 2, 1937 |
| 2,543,191 | Neilson et al. | Feb. 27, 1951 |
| 2,622,273 | Detwiler | Dec. 23, 1952 |
| 2,647,103 | Griffith et al. | July 28, 1953 |
| 2,702,280 | Mackinnon | Feb. 15, 1955 |